United States Patent [19]

Frede

[11] Patent Number: 4,692,576
[45] Date of Patent: Sep. 8, 1987

[54] FLOAT SWITCH USING FOAM BODY FOR FLOATABILITY

[75] Inventor: Dieter Frede, Ennigerloh, Fed. Rep. of Germany

[73] Assignee: Condor-Werk Gebr. Frede GmbH & Co. KG, Ennigerloh, Fed. Rep. of Germany

[21] Appl. No.: 866,745

[22] Filed: May 27, 1986

[30] Foreign Application Priority Data

Jun. 10, 1985 [DE] Fed. Rep. of Germany ... 8516863[U]

[51] Int. Cl.$^4$ .............................................. H01H 35/18
[52] U.S. Cl. .................................. 200/84 R; 200/305; 200/85 R; 73/322.5
[58] Field of Search .............. 73/308, 313, 318, 322.5; 340/623, 625, 689; 307/118; 200/84 R, 85 R, 52 A, 153 A, 61.45 R, 61.5, 61.52, 304, 305

[56] References Cited

U.S. PATENT DOCUMENTS

| | | | |
|---|---|---|---|
| 3,483,341 | 12/1969 | Reichensperger | 200/84 R |
| 3,944,770 | 3/1976 | Pepper | 200/84 R |
| 4,110,585 | 8/1978 | Brown | 200/305 |
| 4,496,806 | 1/1985 | Maenishi | 200/305 |

FOREIGN PATENT DOCUMENTS 7604668 9/1976 Fed. Rep. of Germany .
2744404 4/1979 Fed. Rep. of Germany .

Primary Examiner—G. P. Tolin
Attorney, Agent, or Firm—Erwin S. Teltscher

[57] ABSTRACT

A float switch arrangement includes a holding and sealing component which is made of an electrically conductive material. An electric switch is accommodated in the holding and sealing component. An electric cable is connected to the electric switch and includes an end portion situated at a connection zone. Electric conductors extend from the end portion of the current supply cable through the connection zone to the electric switch and are electrically connected to the electric switch. A gravity actuation arrangement which is operative for actuating the electric switch is also accommodated in the holding and sealing component. A float housing constituted solely by a body of a closed-pore integral foam surrounds the holding and sealing component, the electric switch, the gravity actuation arrangement, and the end portion of the gavity actuation arrangement and the electric conductors at the connection zone and seals the connection zone against penetration of moisture therethrough.

5 Claims, 2 Drawing Figures

FLOAT SWITCH USING FOAM BODY FOR FLOATABILITY

BACKGROUND OF THE INVENTION

The present invention relates generally to control arrangements and more particularly to float switches.

There are already known various float switch constructions, among them such which include a housing which is manufactured with the use of a closed-pore integral foam, an electric switch positionally fixed in the housing, a gravity actuation arrangement which actuates the electric switch, and a current supply cable having an end portion which is fixed in position with respect to the housing and the connection zone of which to the electric switch is embedded in such a manner as to be protected against penetration of moisture therethrough.

The heretofore known float switch constructions of the type described above obtain the buoyant force which is needed for their floating capability as a result of the formation of air chambers of sufficient volume in the interior of the float housing. A typical example of float switch arrangement constructions of this type is disclosed, for instance, in the German published patent application DE-OS 27 44 404, in which the electric switch and the gravity actuation arrangement are accommodated in an encapsulated inner housing into which a connecting zone of a current supply cable is inserted. This inner housing is then surrounded at a distance by a second, outer housing which is also encapsulated. In this construction, the connection zone of the electrical conductors of the current supply cable, which is situated in the interior of the inner encapsulated housing, is filled with a molded material in such a manner as to be impervious to moisture.

While adhering to the principles of double housing construction of the float housing and of achievement of the floatability of the float switch arrangement by a sufficient air chamber dimensioning, it has also been already proposed, for instance, in the German Utility Model DE-GM 76 04 668 to make the outer housing of an integral foam which closely surrounds the inner housing, the integral foam being of the type having closed pores. Herein, the integral foam layer is so chosen that the specific weight of the housing is held so low that the housing remains floatable despite the presence of the additional synthetic plastic material layer, due to the provision of the air chamber in the inner housing.

Float switch arrangements of this kind are very often used outside, where they are often subjected to considerable temperature variations. Now, it has been established that, in the heretofore customary float switch arrangement constructions, considerable pressure variations toward the superatmospheric pressure or toward the subatmospheric pressure may occur in the quite sizable air chambers contained in the respective float switch arrangement interiors. Such pressure variations not only deleteriously influence an exact response of the float switch arrangement, but also exert so-called "pumping effects" on moisture precipitated in the current supply cable which is also subjected to such temperature variations, as well as in the electric conductors of the current supply cable, so that, despite the encasement of the connection zone of the electric conductors, there can still occur drawing-in of moisture not only out of the jacket of the current supply cable, but even out of the small insulated electric conductors.

SUMMARY OF THE INVENTION

Accordingly, it is a general object of the present invention to avoid the disadvantages of the prior art.

More particularly, it is an object of the present invention to provide a float switch arrangement which does not possess the disadvantages of the known float switch arrangement constructions.

Still another object of the present invention is to develop a float switch arrangement of the type here under consideration in which the aforementioned pumping effect is avoided.

It is yet another object of the present invention to devise a float switch arrangement of the above type which is relatively simple in construction, inexpensive to manufacture, easy to make and use, and reliable in operation nevertheless.

In keeping with these objects and others which will become apparent hereafter, one feature of the present invention resides in a float switch arrangement which comprises, in combination, a holding and sealing component of an electrically conductive material; an electric switch accommodated in the holding and sealing component; electric conductor means connected to the electric switch, including a current supply cable having an end portion situated at a connection zone and electric conductors extending from the end portion of the current supply cable through the connection zone to the electric switch and electrically connected to the electric switch; means for actuating the electric switch, including a gravity actuation arrangement which is also accommodated in the holding and sealing component; and a float housing constituted solely by a body of a closed-pore integral foam which surrounds the holding and sealing component, the electric switch, the gravity actuation arrangement, and the end portion of the electric supply cable and the electric conductors at the connection zone and seals the connection zone against penetration of moisture therethrough.

In the float switch arrangement constructed in the manner described so far, the floatability of the float switch arrangement in the sense of the achievement of buoyancy is accomplished not so much by the formation of any air chamber in the housing but rather substantially only by the single housing itself which consists exclusively of a closed-pore integral foam. While it is true that, in this construction according to the present invention, air spaces are still present in the interior of the electric switch and in the interior of the gravity actuation arrangement, these relatively small air spaces are so extraordinarily well insulated with respect to the exterior of the float switch arrangement by the surrounding closed-pore integral foam housing that the ambient temperature variations have no effect in such internal air spaces. As a result of this, any pump effect on any moisture that may have precipitated in the current supply cable or in its electric conductors is avoided. Moreover, the connection zone of the electric conductors is especially well sealed against penetration of moisture therethrough by the closed-pore integral foam.

The holding and sealing component makes it possible to provide an unproblematical spatial correlation of the electric switch and of the gravity actuation arrangement in the functionally correct relative positions to one another, while simultaneously providing for a corresponding accessibility of the switching element of the electric switch through the switching weight of the switching arrangement. This part, because of its sealing function, prevents the otherwise possible penetration of the integral foam during the manufacture of the float switch arrangement into the actuating zone or into the gravity actuation arrangement.

A particular problem encountered in float switch arrangements of this kind is also the voltage diversion. If the housing is mechanically damaged, water can penetrate under certain circumstances all the way to the electric switch, so that it is then extremely dangerous to get into contact with the liquid on which the float switch arrangement floats. It is currently customary to build-in separate shielding sheet metal elements in the heretofore known double-housing float switch arrangement, and to connect the grounding conductor of the respective current supply cable to such shielding elements. In accordance with the present invention, the protective function is additionally taken over in the simplest imaginable fashion by the holding and sealing component which consists of the electrically conductive material and to which the electric grounding conductor may be connected.

The float switch arrangement according to the present invention is also extremely simple as far as its manufacture is concerned, particularly since the heretofore necessary double fabrication of encapsulated housings is avoided. It is sufficient here to insert the electric switch and the gravity actuation arrangement into the holding and sealing component, to properly position the current supply cable and its electric conductors, and to foam the float housing of the closed-pore integral foam around this assembly.

It is particularly advantageous when the gravity actuation arrangement includes a switch body having an open insertion end, when the holding and sealing component forms a receiving chamber for the electric switch and a receiving space for the switch body; and when the receiving chamber and the receiving space have respective bottom regions which communicate with one another to form a switching zone which is enclosed with respect to the exterior.

According to another advantageous aspect of the present invention, the gravity actuation arrangement further includes a ball displaceable in a predetermined path, the electric switch includes a switching pin and a switching lever, and the holding and sealing component includes a bottom member. Then, the switching zone is advantageously arranged in the bottom member in such a manner and the electric switch is caused by an inclined orientation of the bottom region of the receiving chamber for the electric switch to assume such a position that the switching pin and the switching lever directly project into the switch body and into the predetermined path of displacement of the ball.

Advantageously, there is additionally provided means for separately further sealing the bottom region of the receiving chamber for the electric switch in the holding and sealing component, such further sealing means including a circumferentially extending sealing lip.

Last but not least, it is advantageous when the holding and sealing component includes, at its side receiving the electric switch, lateral webs for the lateral delimitation of the receiving space, the webs extending beyond the electric switch in the inserted position of the electric switch and also overlapping the connection zone through which the electric conductors extend to shield the electric conductors.

BRIEF DESCRIPTION OF THE DRAWING

The present invention will be described in more detail below in conjunction with the accompanying drawing, in which.

DETAILED DESCRIPTION OF THE PREFERRED EMBODIMENT

Figure 1:
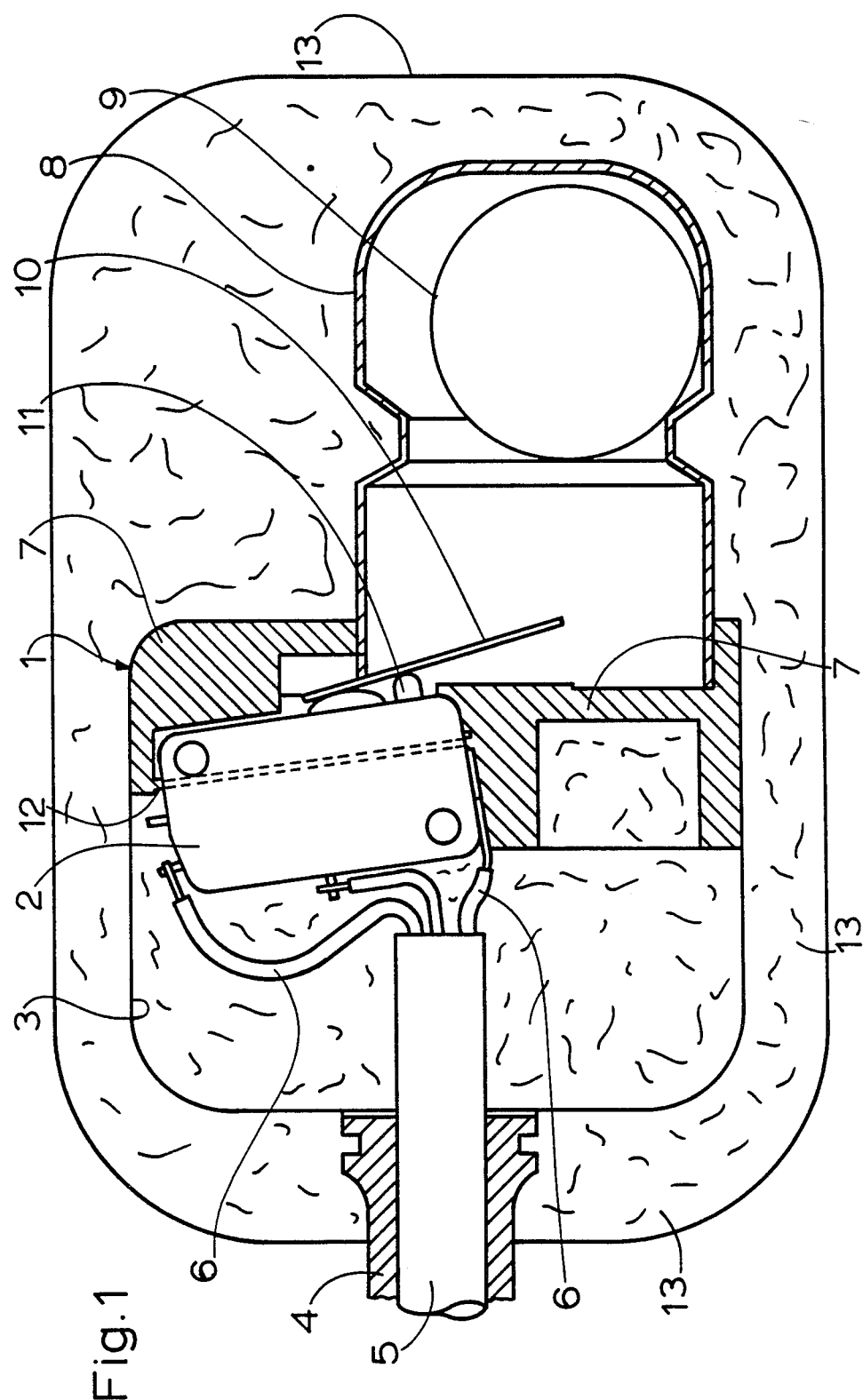
FIG. 1 is a longitudinal sectional view of a float switch arrangement constructed in accordance with the present invention.

Referring now to the drawing in detail, and first to FIG. 1 thereof, it may be seen that it depicts a float switch arrangement which includes a central holding and sealing component 1 which serves the purposes of mutual correlation and position fixation of the various switch elements. The holding and sealing component 1 is made of an electrically conductive material, for instance, of a metal or an electrically conductive synthetic plastic material.

A receiving chamber for an electric switch 2 of the float switch arrangement is formed in the holding and sealing component 1 at the left-hand side as considered in FIG. 1. This receiving chamber is laterally delimited by two elongated webs 3 which may be of different lengths with respect to one another but which, in any event, extend beyond the electric switch 2 in its inserted position. At least one of the webs 3 also extends so far that it shields an end portion of an electric current supply cable 5, which is fixed in position in the float switch arrangement by means of a buckling prevention member 4 in a manner which will be explained in more detail later, as well as the connecting conductors 6 of the current supply cable 5 of which the grounding connector is connected to the holding and sealing component 1.

A bottom member 7 of the holding and sealing component 1 is so configured that it defines a certain inclined position for the inserted electric switch 2. The bottom member 7 further defines, at its other side, a cylindrical receiving space for a switch body 8 of the gravity actuation arrangement, in which a sphere 9 is displaceable in a customary manner. Herein, the switch body 8 is left open at its insertion end with respect to the bottom member 7, and a certain bottom region of the receiving chamber for the electric switch 2 is left open at an offset with respect to the cylindrical receiving space for the switch body 8 in such a manner that, as may be seen in FIG. 1 of the drawing, a switching lever 10 which is pivotably mounted on the electric switch 2 can directly project, also because of the inclined position of the electric switch 2, into the path of displacement of the sphere 9. Herein, a switching pin 11 of the electric switch 2 is disposed underneath this switching lever 10 of the electric switch 2.

Figure 2:
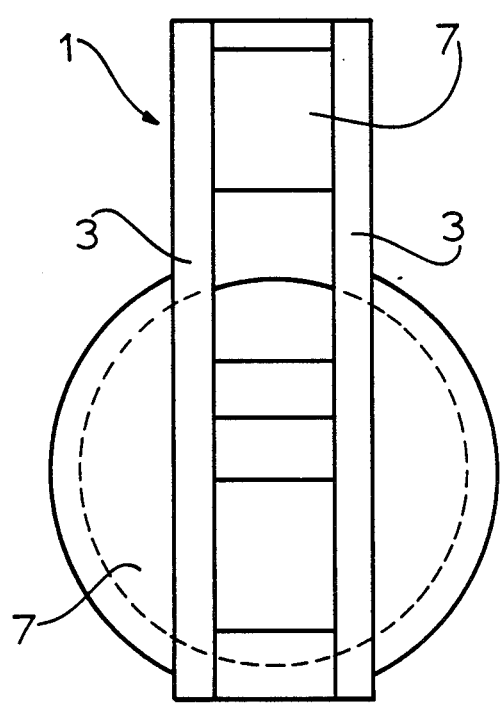
FIG. 2 is a top plan view of a holding and sealing component which constitutes a part of the float switch arrangement of FIG. 1.

A comparison of FIGS. 1 and 2 with one another will reveal that, as a result of the above-discussed construction of the bottom member 7, the internal space of the switch body 8, as well as the switching zone formed between the switch body 8 and the electric switch 2, are sealed with respect to the exterior of the float switch arrangement. As an additional precautionary measure, a circumferentially extending sealing lip 12 can be additionally provided on the holding and sealing component 1 at the vicinity of the bottom region of the receiving chamber for the electric switch 2 which, as can be seen from FIG. 1, cooperates with the casing of the electric switch 2.

In order to increase the shielding effect against an otherwise possible electric current diversion in the event of a mechanical damage of the float switch housing, even the switch body 8 of the float switch arrangement can be made of an electrically conductive material, such as a metal or an electrically conductive synthetic plastic material.

For the formation of the single unitary float housing, the above-discussed arrangement which consists of the holding and sealing component 1 with the inserted electric switch 2 and the inserted switch body 8 of the gravity actuation arrangement, as well as the connection zone which is situated between the webs 3 of the holding and sealing component 1 and includes the electric connectors 6, the current supply cable 5 and the corresponding end of the buckling prevention member 4 of the current supply cable 5, is now surrounded by or embedded in a closed-pore integral foam body, for instance, on the basis of polyurethane, so as to provide a housing 13. Herein, the abovediscussed construction of the holding and sealing component 1 assures that the integral foam does not penetrate during such embedding operation into the switch body 8 or into the switching zone formed in the bottom member 7 between the electric switch and the switch body 8. All other regions are surrounded or filled by the foam, particularly also the entire connection zone between the webs 3. The single unitary float housing 13 is so dimensioned that it provides, for all intents and purposes by itself, the buoyant force needed for the floating of the float switch due to the presence of the closed pores in the foamed material of the float housing 13.

While the present invention has been described and illustrated herein as embodied in a specific construction of a float switch, it is not limited to the details of this particular construction, since various modifications and structural changes are possible and contemplated by the present invention. Thus, the scope of the present invention is to be determined exclusively by the appended claims.

What is claimed:

1. A float switch comprising
a holding and sealing component;
an electric switch accomodated in said holding and sealing component;
electric conductor means connected to said electric switch, including a current supply cable having an end portion situated at a connection zone and electric conductors extending from said end portion of said current supply cable through said connection zone to said electric switch and electrically connected to said electric switch;
means for actuating said electric switch, including a gravity actuation arrangement having a separate gravity switch body, said gravity actuation arrangement being also accomodated in said holding and sealing component; and
a float housing constituted solely by a body of a closed-pore integral foam which surrounds said holding and sealing component, said electric switch, said gravity actuation arrangement, and said electric conductors at said connection zone, and seals said connection zone against penetration of moisture therethrough, said separate gravity switch body having a relatively small air space compared to space occupied by said float housing,
whereby floatability in the sense of achievement of buoyancy is accomplished substantially only by said float housing, wherein said switch body has an open insertion end; wherein said holding and sealing component forms a receiving chamber receiving said electric switch and a receiving space receiving said switch body; and wherein said receiving chamber and said receiving space have respective end regions which communicate with one another to form a switching zone which is enclosed with respect to the interior; and additionally comprising means separately further sealing said end region of said receiving chamber for said electric switch in said holding and sealing component, including a circumferentially extending sealing lip on said holding and sealing component at said end region of said receiving chamber, which engages with a casing of said electric switch.

2. The float switch as defined in claim 1, wherein said gravity actuation arrangement further includes a sphere displaceable in a predetermined path; wherein said electric switch includes a switching pin and a switching lever; wherein said holding and sealing component includes a bottom member; and wherein said switching zone is arranged in said bottom member in such a manner and the electric switch is caused by an inclined orientation of said bottom region of said receiving chamber to assume such a position that said switching pin and said switching lever directly project into said switch body and into said predetermined path of displacement of said sphere.

3. The float switch as defined in claim 1, wherein said holding and sealing component includes, at a side thereof receiving said electric switch, lateral webs for the lateral delimitation of said receiving space, said webs extending beyond said electric switch in an inserted position thereof, also overlapping said connection zone through which said electric conductors extend, to shield said electric conductors.

4. The float switch as defined in claim 1, wherein said switch body is formed as an elongated chamber of prearranged length and width so as to permit a sphere of a predetermined diameter disposed therein to travel between first and second longitudinally stable positions along a travel length thereof limited to less than twice said diameter, while lateral movement of said sphere in a direction transverse to said prearranged length is limited to about one and one third of said diameter, thereby minimizing air space in said chamber contributing to floatability.

5. The float switch as defined in claim 1, wherein said holding and sealing component is made of an electrically conductive material.

* * * * *